United States Patent
Sham et al.

(10) Patent No.: US 8,723,661 B2
(45) Date of Patent: May 13, 2014

(54) MOUNT-FREE TIRE PRESSURE MONITORING SYSTEM

(75) Inventors: Man Lung Sham, Hong Kong (HK); Xiang Chen, Hong Kong (HK); Ziyang Gao, Hong Kong (HK); Shi Wo Chow, Hong Kong (HK)

(73) Assignee: Hong Kong Applied Science and Technology Research Institute Company Limited, Hong Kong Science Park Shatin, New Territories, Hong Kong (CN)

( * ) Notice: Subject to any disclaimer, the term of this patent is extended or adjusted under 35 U.S.C. 154(b) by 262 days.

(21) Appl. No.: 13/284,994

(22) Filed: Oct. 31, 2011

(65) Prior Publication Data
US 2013/0106597 A1    May 2, 2013

(51) Int. Cl.
*B60C 23/00* (2006.01)
*B60C 23/02* (2006.01)
*B60C 23/10* (2006.01)

(52) U.S. Cl.
USPC ............ 340/447; 116/34; 152/415; 73/146.5

(58) Field of Classification Search
USPC ............ 340/442–447; 116/34; 152/415–418; 73/146.5
See application file for complete search history.

(56) References Cited

U.S. PATENT DOCUMENTS

| | | | | |
|---|---|---|---|---|
| 5,880,363 | A * | 3/1999 | Meyer et al. | 73/146.5 |
| 6,516,660 | B1 * | 2/2003 | Koch et al. | 73/146.5 |
| 6,557,405 | B2 * | 5/2003 | Shimura et al. | 73/146 |
| 2002/0073771 | A1 * | 6/2002 | Katou | 73/146 |
| 2005/0192727 | A1 * | 9/2005 | Shostak et al. | 701/37 |
| 2008/0121032 | A1 * | 5/2008 | Qiu et al. | 73/146.8 |
| 2010/0164705 | A1 * | 7/2010 | Blanchard | 340/442 |

* cited by examiner

*Primary Examiner* — Jennifer Mehmood
*Assistant Examiner* — Omar Casillashernandez
(74) *Attorney, Agent, or Firm* — Ella Cheong Hong Kong; Sam T. Yip

(57) ABSTRACT

A tire pressure monitoring sensor moveable inside a tire includes a housing holding a pressure sensing/transmitting unit, one or more batteries and an antenna for transmitting a signal indicating interior tire pressure. In one embodiment, the components are assembled within the housing such that the center of gravity is along a housing geometric center. During tire rotation, the monitor independently rotates within the tire and is particularly useful for slow-rotating tires, such as those used in gantry systems. Alternatively, the pressure monitoring sensor components are assembled within the housing such that the center of gravity is offset from a housing geometric center. Centripetal force generated during tire rotation causes the monitor to rotate with the tire itself and is useful for faster-rotating tires, such as motor vehicle tires. A tire pressure monitoring system includes the monitor and a receiver positioned outside the tire for receiving the monitoring signals.

16 Claims, 4 Drawing Sheets

MOUNT-FREE TIRE PRESSURE MONITORING SYSTEM

FIELD OF THE INVENTION

The present invention relates to a tire pressure monitoring system and, more particularly to a tire pressure monitoring sensor that can move freely within a tire or inner tube.

BACKGROUND

Vehicles equipped with pneumatic tires have come under increased scrutiny as requiring more detailed information regarding tire pressure. Such tire pressure information is required for safe operation of the vehicle and for greater fuel efficiency (in the case of motor vehicles) since underinflated vehicle tires cause increased fuel consumption compared to properly inflated tires. To monitor tire pressure, various systems have been proposed. In general, tire pressure monitoring systems include a pressure monitor and an element which can transmit the tire pressure information, typically in the form of a radio frequency (r.f.) signal, to a receiver. Such receivers can be positioned in a monitoring station (for tire-based machinery such as rubber-tired gantry systems used in container shipment systems) or inside a vehicle for automobiles and trucks. In this manner the tire pressure information can be displayed and/or alarms can be set to alert the operator of the machinery/vehicle when one or more tires has reached a critical level of underinflation or overinflation.

Several configurations have been proposed. In one system, part of the pressure monitoring system is the tire valve itself, such as the valve stem or the valve pin as an antenna or an antenna portion to transmit a signal from an internal tire pressure sensor to a receiver. Such systems are disclosed in U.S. Pat. Nos. 6,101,870, 7,059,178, 7,328,609, 7,549,329 and U.S. Patent Publication 2008/0121031. However, for high pressure tires, such as the gantry equipment discussed above, valve based systems have can have air leakage problems and valves can be easily damaged.

In another configuration, a tire pressure sensor can be mounted on a tire rim (for tubeless tires). However, there are numerous custom rim designs in the wide variety of machines that employ pneumatic tires. Therefore, it is difficult to install rim-mounted tire pressure sensors on all the types of custom rims that are used in such tires. For tires that cannot use rim-mounted pressure sensors, pressure sensors are typically affixed to an inner tire wall using, for example, special adhesives. Such mounting is time-consuming and also wasteful of the tire sensor which is discarded at the end of the useful tire life.

It has been proposed to use freely-moving pressure sensors inside tires that include piezoelectric elements for energy harvesting from vibrations during vehicle motion. Such systems are described in U.S. Patent Publication 2010/0164705 and U.S. Pat. No. 7,936,109. While such sensors may have application for relatively fast-moving vehicles (such as automobiles) which generate large numbers of collisions, many mechanical systems with pneumatic tires are slow-moving or do not move for long periods. Therefore, insufficient numbers of collisions are generated to power such sensors. Even when sufficient collisions are generated, there are concerns that a sensor can suddenly fail during a sensor collision. For personal automobiles, a sensor failure is not catastrophic; however in large equipment systems, replacement of a sensor can mean closing down an entire system while a new sensor is installed.

Therefore, there is a need in the art for freely movable pressure sensors positioned within tires that are easily installed, reusable, and reliable.

SUMMARY OF THE INVENTION

The present invention relates to a mount-free tire pressure monitoring sensor moveable inside a tire. The tire pressure monitoring sensor includes a housing having at least a portion of an outer surface that is curved. The housing is configured to hold components of the tire pressure monitoring sensor. The components include a pressure sensing/transmitting unit including a pressure sensing portion for sensing an interior pressure of a tire and outputting a signal indicating the interior tire pressure. A processing portion is electrically coupled to the pressure sensing portion for processing the output signal indicating interior tire pressure to generate a monitoring signal indicating the current interior pressure of the tire. A transmitting portion is coupled to the processing portion for transmitting the monitoring signal outside the tire via an antenna.

At least one battery is electrically coupled to the pressure sensing/monitoring unit and the processor for providing electrical power.

In one embodiment, the components of the tire pressure monitoring sensor are assembled within the housing such that the center of gravity of the combined housing and components is substantially along a geometric center of the housing. In this configuration, when the tire within which tire pressure monitoring sensor is positioned is rotating, the sensor independently rotates within the tire, typically at a single position against an inner tire wall. This embodiment is particularly useful for slow-rotating tires, such as those used in gantry systems.

In an alternative embodiment, the components of the tire pressure monitoring sensor are assembled within the housing such that the center of gravity of the combined housing and components is positioned offset from a geometric center of the housing. In this manner, centripetal force generated during rotation of the tire causes the tire pressure monitoring sensor to rotate with the tire. That is, the sensor does not independently rotate but assumes a position against an interior surface of the tire and stays in this position held by the centripetal force exerted on the sensor during tire rotation. This embodiment is particularly useful for faster-rotating tires, such as automobile or other motor vehicle tires.

A tire pressure monitoring system includes the monitoring sensor and a receiver positioned outside the tire for receiving the monitoring signals.

DETAILED DESCRIPTION

Figure 1:
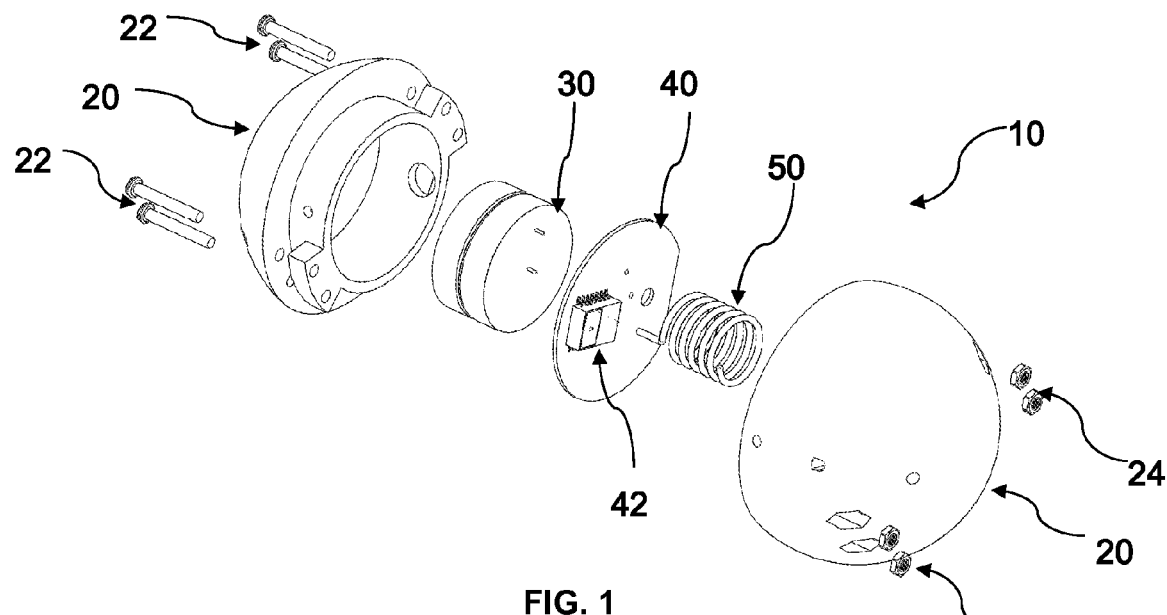
FIG. 1 depicts a perspective view of a tire pressure monitoring sensor with the parts separated for ease of description.

Turning to the drawings in detail in which like numerals indicate the same or similar elements in each of the several views, FIG. 1 depicts a tire pressure monitoring sensor 10 configured to be movable within a tire (within a tubeless tire or within an inner tube of a non-tubeless tire); that is, sensor 10 is not required to be fixedly mounted in a single position to either a tire rim or to any portion of the tire itself.

Sensor 10 includes housing 20, shown in FIG. 1 as being a two-part housing fastened together with fasteners 22. Fasteners 22 are depicted as threaded fasteners with locking members 24. However, it is understood that the portioning of the housing is not critical; the depicted housing is for ease of assembly and other configurations such as an opening at one end with a snap-fit hinged door or any other configuration permitting component insertion in the housing can be used for the sensor 10.

Housing 20 includes at least one curved outer portion such that the sensor 10 is able to rotate within a tire (as discussed below). The housing of FIG. 1 is approximately spherical although any rotatable shape can be used as the sensor housing. The sensor housing can be made of a resilient material in order to damp collisions within the tire. Alternatively, a layer of damping material can be positioned within the housing 20 to protect the interior components. In this embodiment, it is preferable that the housing exterior include a material having a low coefficient of friction to facilitate rotation of the sensor 10 within the tire.

Figure 2:
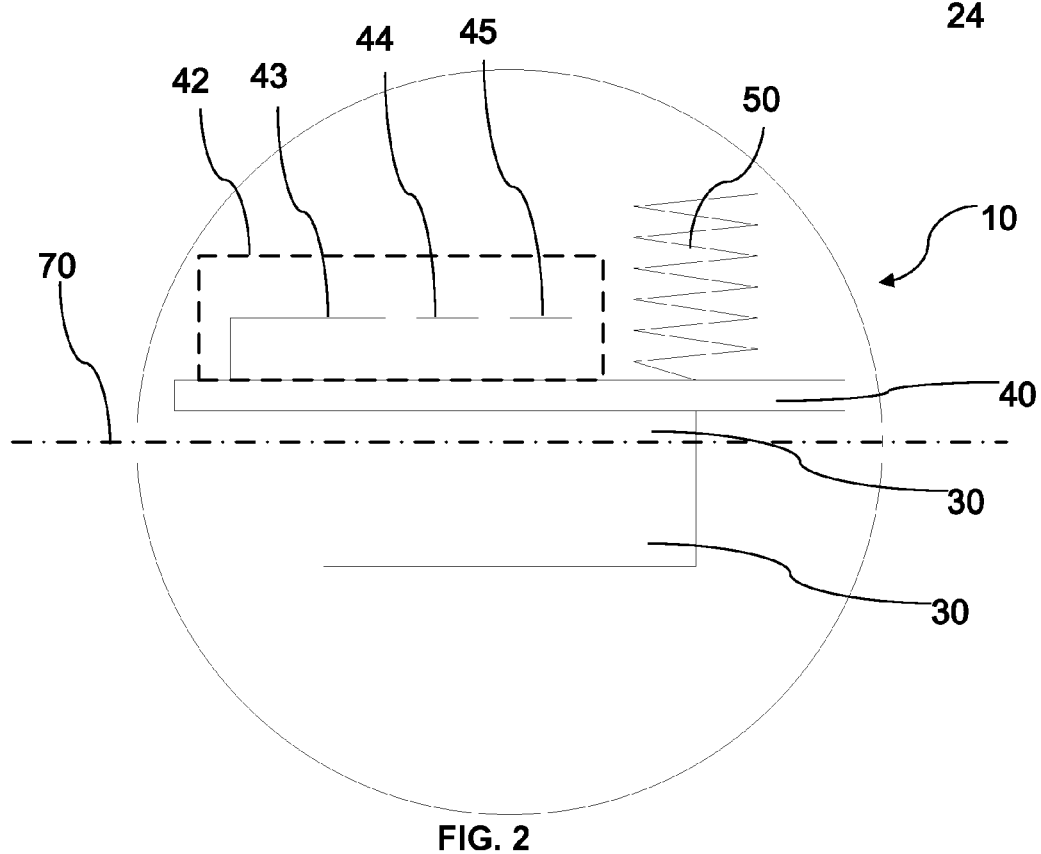
FIG. 2 depicts the assembled monitoring sensor of FIG. 1 showing the center of gravity line.

To further enable rotation of the sensor 10 within a tire, the center of gravity 70 of the assembled sensor 10 as seen in FIG. 2 is selected to be substantially the geometric center of sensor 10. To the end, the relatively heavy battery component 30 is positioned approximately symmetrically about the geometric center of the sensor. That is, for a single battery, the single battery is positioned at the geometric center. For a two battery configuration, one battery is positioned on either side of the geometric center, as seen in FIG. 2.

A printed circuit board 40 that includes a pressure sensing/transmitting unit 42 mounted thereon, is positioned adjacent to and in electrical communication with, battery or batteries 30. The pressure sensing/transmitting unit 42 includes a pressure sensing portion 43 for sensing an interior pressure of a tire and outputting a signal indicating the interior tire pressure. A processor portion 44 electrically coupled to the pressure sensing portion 43 processes the output signal indicating interior tire pressure received from the pressure sensing portion 43 to generate a monitoring signal indicating the current interior pressure of the tire. A transmitter portion 45, typically an rf transmitter, is coupled to the processor portion 44 creates a transmission signal including tire pressure information for transmission outside the tire. The three portions of pressure sensing/transmitting unit 42 can be integrated as a single component or can be separate components as shown. Alternatively, two of the three components can be integrated as a single component.

The transmission signals are output to antenna 50 for transmission outside the tire. Antenna 50 is depicted as a coil antenna; however other antenna configurations can be selected based upon the frequency of the monitoring signal to be transmitted.

An access hole 60 including sealing ring 62 in housing 20 ensures communication of the pressure sensor 10 with the ambient conditions inside the tire for accurate pressure sensing.

The interior of housing 20 can be molded to securely accommodate the sensor components to prevent damage from collisions with the tire and rim during tire movement. Further, the material and interior configuration can be selected to assist in proper positioning of the center of gravity at the geometric center of the sensor 10.

Figure 3:
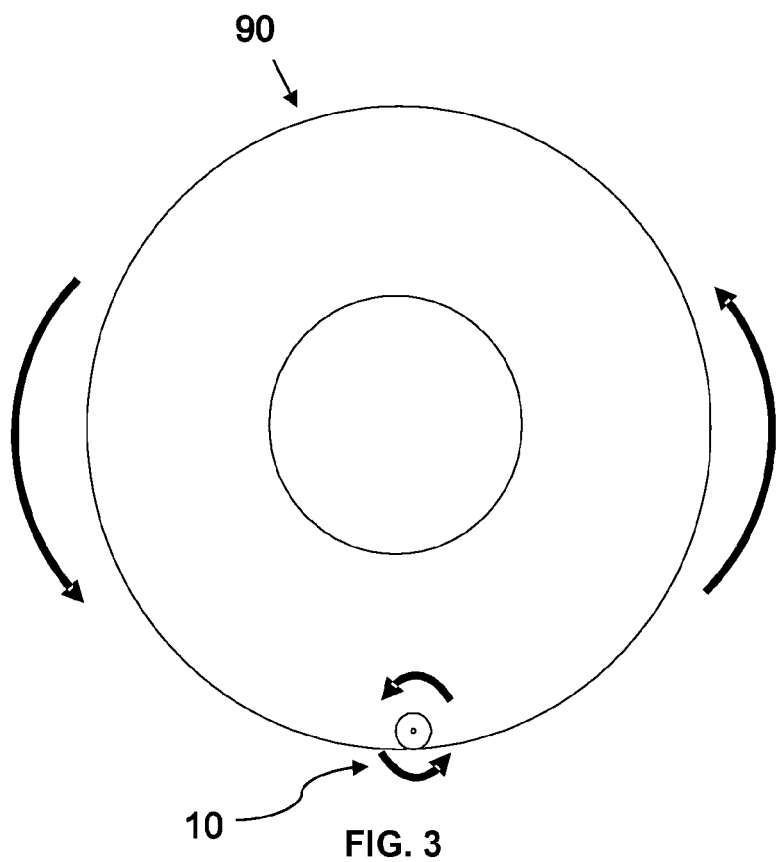
FIG. 3 depicts rotation of the sensor of FIG. 2 inside a rotating tire.

The motion of a tire 90 with sensor 10 positioned therein is depicted in FIG. 3. In FIG. 3, the tire rotates in a counter-clockwise direction. Likewise, the sensor 10 rotates within the tire interior in a counter-clockwise direction in substantially the same location during the tire rotation; it is stationary when the tire is not rotating. In this manner, the number of undesirable collisions with the tire interior and the rim are minimized and the lifespan of the sensor is extended. This configuration is selected for low rotation speed tires such as those used in the gantry systems of container shipping operations.

Advantages of sensor 10 include the fact that the batteries are easily replaced due to the threaded fasteners that permit housing 20 to be easily opened. Because the batteries are easily replaced in sensor 10, and because sensor 10 can be repositioned in a new tire, sensor 10 is more cost effective than sensors that are mounted to a tire interior wall and discarded when the tire is replaced.

Figure 4:
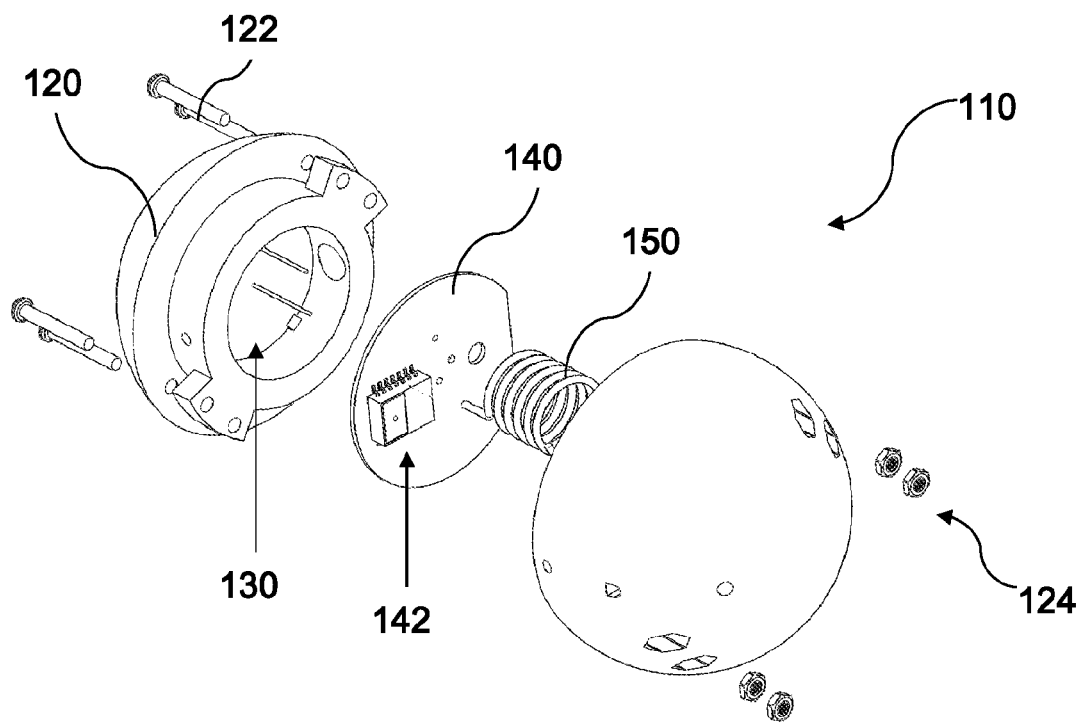
FIG. 4 depicts a perspective view of a tire pressure monitoring sensor with the parts separated according to another embodiment of the present invention.
Figure 5:
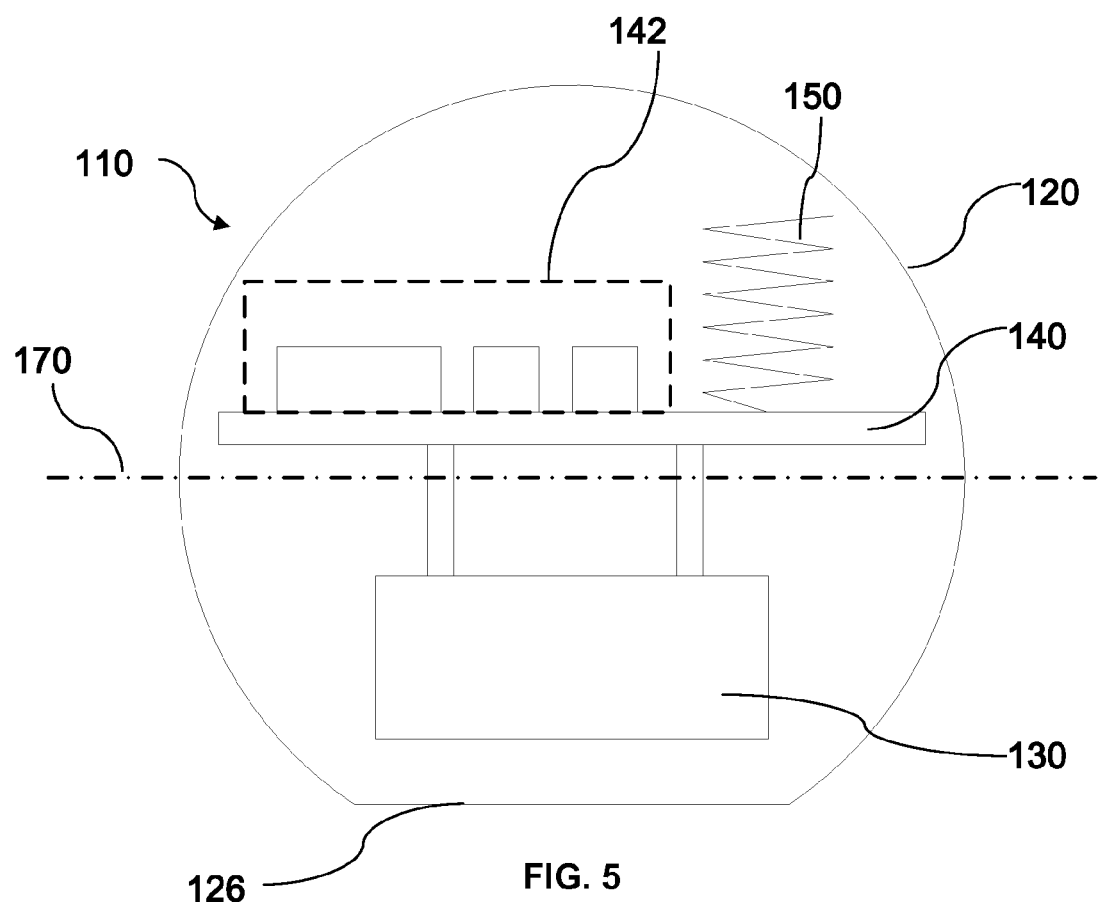
FIG. 5 depicts the assembled monitoring sensor of FIG. 4 showing the center of gravity line.

Another embodiment of the invention is depicted in FIG. 4. The components of FIG. 4, namely pressure sensing/transmitting unit 142 (which can be an integrated unit or separate components as discussed about with respect to FIG. 2), battery or batteries 130, antenna 150, operate in the same manner and the corresponding components discussed above. However, they are positioned within housing 120 such that the center of gravity is offset from the geometric center of gravity as depicted in FIG. 5, location 170. As seen in FIG. 5, a double battery 130 configuration is used with both batteries positioned beneath the geometric center of housing 120. Other configurations that distribute the component weight such that the center of gravity is offset from the center can also be selected based on the weight of the individual components.

Figure 6:
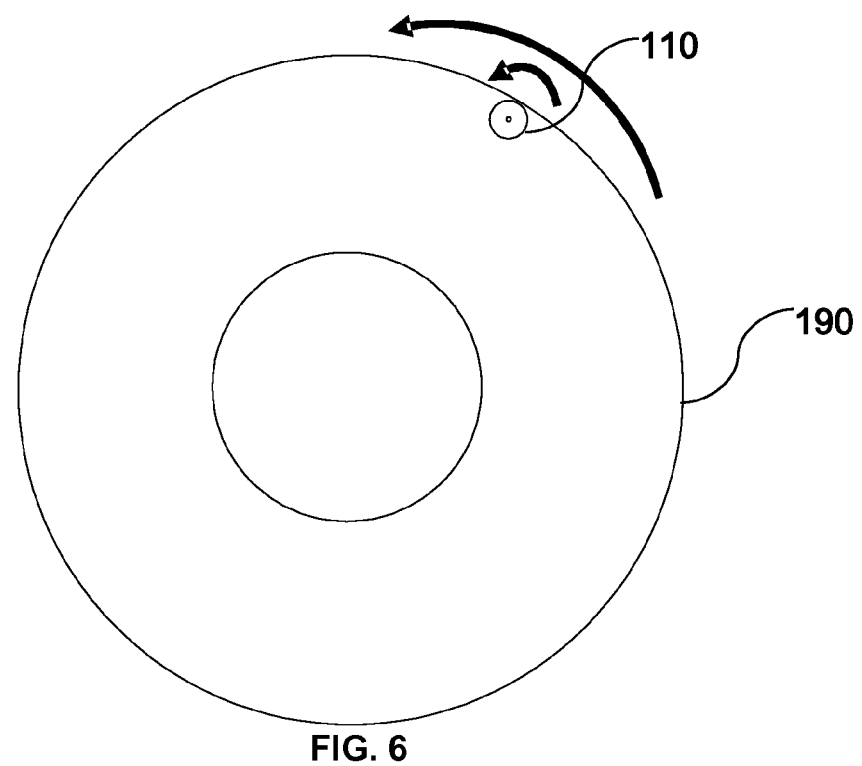
FIG. 6 depicts rotation of the sensor of FIG. 5 inside a rotating tire.
Figure 7:
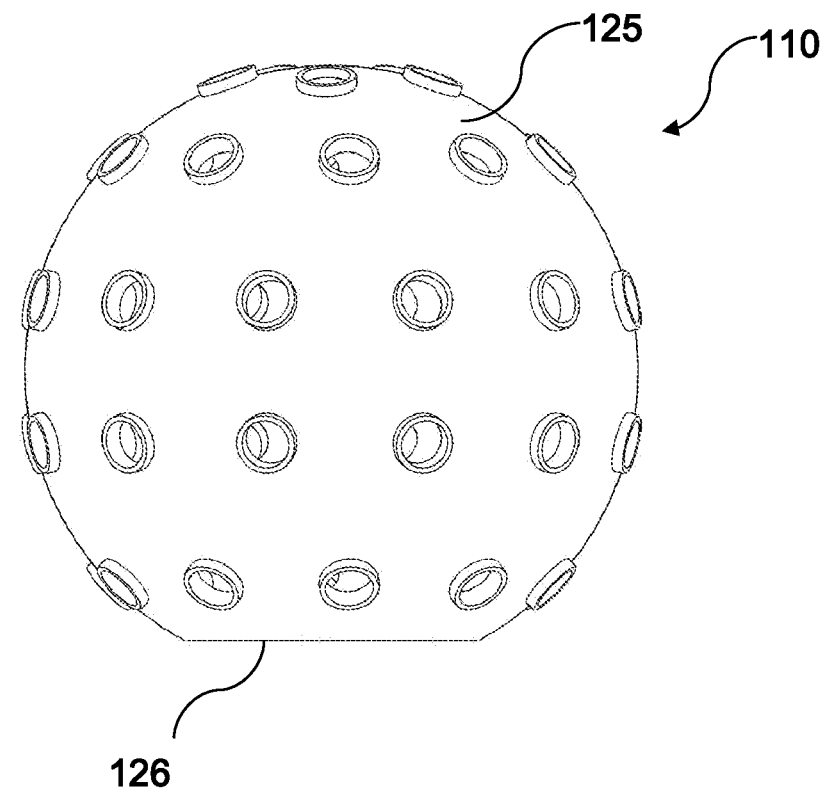
FIG. 7 depicts a high friction exterior for the sensor of FIG. 5.

With the center of gravity offset from the geometric center, the rotation of tire 190 with the sensor 110 positioned therein is as shown in FIG. 6. As the tire rotates in the counter-clockwise direction, the sensor 110 is pushed against the tire interior wall due to centripetal force. As long as the tire keeps rotating, the sensor 110 is maintained by that force in approximately the same position, that is, it rotates with the tire at the tire rotation speed. However, it does not substantially rotate within the tire when the tire rotates at a relatively high speed. To this end, a portion of the housing may be flattened adjacent the offset center of gravity at position 126, as depicted in FIGS. 5 and 7. To further assist the single position rotation of sensor 110, a high friction housing exterior 125 can be formed on sensor housing 120 as shown in FIG. 7. Sensor 110 finds particular application for the faster-rotating tires of motor vehicles which generate sufficient centripetal force for the rotation pattern of FIG. 6.

Figure 8:
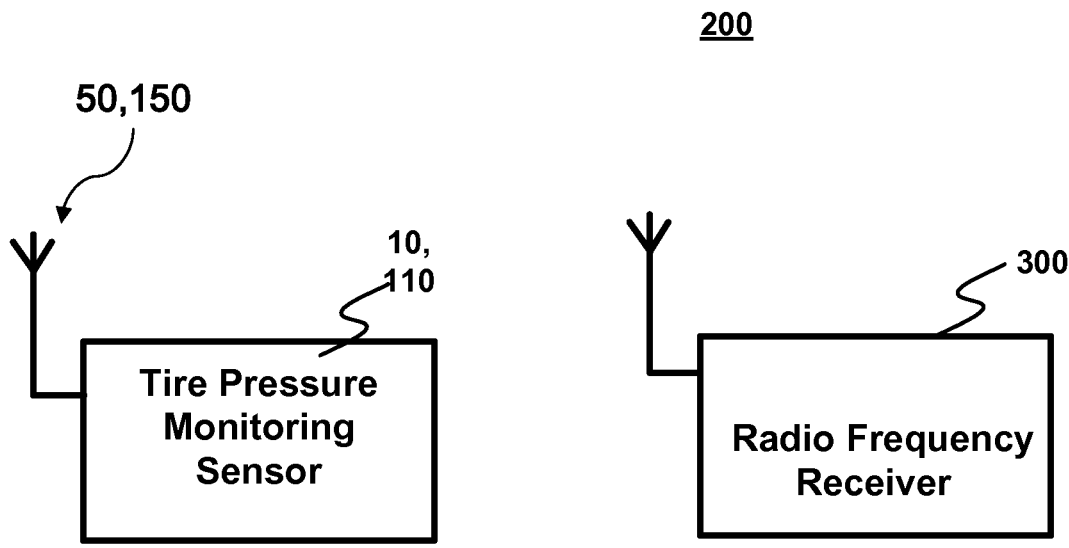
FIG. 8 schematically depicts a receiving system for receiving a monitoring signal from the tire pressure monitoring sensors of the present invention.

The tire pressure monitoring sensor is used in a tire pressure measurement system 200 which includes a radio frequency receiver 300 for receiving the monitoring signal from sensor 10 or 110 emitted from either antenna 50 or 150, as shown in FIG. 8. Receiver 300 is positioned at a location outside the tire in which the sensor is positioned. Typically, one sensor is positioned in each tire to be monitored.

While the foregoing invention has been described with respect to various embodiments, it is understood that other embodiments are within the scope of the present invention as expressed in the following claims and their equivalents. For example, although the sensor does not require mounting, it can be optionally tethered to a tire or inner tube component. The arrangement of the internal components can also vary, as discussed above.

What is claimed is:

1. A tire pressure monitoring sensor moveable inside a tire or a tire inner tube, comprising:
   a rotatable housing having a curved outer surface portion, the housing configured to hold components of a tire pressure monitoring sensor, the components including:
   a pressure sensing/transmitting unit comprising:
       a pressure sensing portion for sensing an interior pressure of a tire and outputting a signal indicating the interior tire pressure;
       a processor portion electrically coupled to the pressure sensing portion for processing the output signal indicating interior tire pressure received from the pressure sensing portion to generate a monitoring signal indicating the current interior pressure of the tire;
       a transmitter portion coupled to the processor portion for creating a transmission signal including tire pressure information for transmission outside the tire;
   an antenna electrically coupled to the pressure sensing/transmitting unit;
   at least one battery electrically coupled to the pressure sensing/transmitting unit for providing electrical power to the pressure sensing/transmitting unit;
   wherein the components of the tire pressure monitoring sensor are assembled within the housing such that during rotation of a tire or tire inner tube inside which the tire pressure monitoring sensor is positioned, movement of the tire pressure monitoring sensor within the tire or the tire inner tube is minimized and number of collisions between the tire pressure monitoring sensor and the tire or the tire inner tube is also minimized; and
   wherein, when the tire pressure monitoring sensor is used in a slow rotation speed tire, the components of the tire pressure monitoring sensor within the housing are configured such that center of gravity of the combined housing and components is along geometric center of the housing such that during slow rotation of the tire or the tire inner tube, the tire pressure monitoring sensor independently self-rotates within the tire or the tire inner tube interior at approximately same spatial location.

2. The tire pressure monitoring sensor of claim 1, wherein the housing includes a damping material to damp the impact force between the tire pressure monitoring sensor and the inside surface of the tire or the tire inner tube.

3. The tire pressure monitoring sensor of claim 1, wherein the pressure sensing/transmitting unit includes an integrated component having two or more of the pressure sensing portion, processor portion or transmitting portion in the integrated component.

4. The tire pressure monitoring sensor of claim 1, wherein the pressure sensing portion, processor portion, and transmitting portion of the sensing/transmitting unit form a single integrated component.

5. The tire pressure monitoring sensor of claim 1, wherein one or more of the pressure sensing/transmitting unit and the at least one battery is positioned near the geometric center of the housing.

6. The tire pressure monitoring sensor of claim 1, wherein the at least one battery includes first and second batteries, and the first battery is positioned on one side of the geometric center of the housing and the second battery is positioned on the other side of the geometric center of the housing.

7. The tire pressure monitoring sensor of claim 1, wherein an exterior surface of the housing comprises one or more materials having a low coefficient of friction to facilitate the independent self-rotation of the sensor within the tire when the tire is rotating.

8. A tire pressure monitoring sensor moveable inside a tire or a tire inner tube comprising:
   a rotatable housing having a curved outer surface portion, the housing configured to hold components of a tire pressure monitoring sensor, the components including:
   a pressure sensing/transmitting unit comprising:
       a pressure sensing portion for sensing an interior pressure of a tire and outputting a signal indicating the interior tire pressure;
       a processor portion electrically coupled to the pressure sensing portion for processing the output signal indicating interior tire pressure received from the pressure sensing portion to generate a monitoring signal indicating the current interior pressure of the tire;
       a transmitter portion coupled to the processor portion for creating a transmission signal including tire pressure information for transmission outside the tire;
   an antenna electrically coupled to the pressure sensing/transmitting unit;
   at least one battery electrically coupled to the pressure sensing/transmitting unit for providing electrical power to the pressure sensing/transmitting unit;
   wherein the components of the tire pressure monitoring sensor are assembled within the housing such that during rotation of a tire or tire inner tube inside which the tire pressure monitoring sensor is positioned, movement of the tire pressure monitoring sensor within the tire or the tire inner tube is minimized and number of collisions between the tire pressure monitoring sensor and the tire or the tire inner tube is also minimized; and
   wherein, when the tire pressure monitoring sensor is used in a fast rotation speed tire, the components of the tire pressure monitoring sensor within the housing are configured such that center of gravity of the combined housing and components is substantially offset from geometric center of the housing such that during fast rotation of the tire or the tire inner tube, the tire pressure monitoring sensor is pushed against inside surface of the tire or the tire inner tube and held still at a single location on the inside surface due to centripetal force exerted on the combined housing and components.

9. The tire pressure monitoring sensor of claim 8, wherein the housing further include a flat portion on the exterior surface adjacent the offset center of gravity position of the combined housing and components.

10. The tire pressure monitoring sensor of claim 8, wherein one or more of the pressure sensing/transmitting unit and the at least one battery is positioned offset from the geometrical center of the housing.

11. The tire pressure monitoring sensor of claim 8, wherein the housing exterior surface includes one or more materials having a high coefficient of friction such that the tire pressure monitoring sensor maintains substantially the same position when the tire is rotating.

12. A tire pressure monitoring system comprising the tire pressure monitoring system of claim 1 and a receiver positioned outside a tire for receiving a tire pressure monitoring signal.

13. A tire pressure monitoring system comprising the tire pressure monitoring system of claim 8 and a receiver positioned outside a tire for receiving a tire pressure monitoring signal.

14. The tire pressure monitoring sensor of claim 8, wherein the housing includes a damping material to damp the impact force between the tire pressure monitoring sensor and the inside surface of the tire or the tire inner tube.

15. The tire pressure monitoring sensor of claim 8, wherein the pressure sensing/transmitting unit includes an integrated component having two or more of the pressure sensing portion, processor portion or transmitting portion in the integrated component.

16. The tire pressure monitoring sensor of claim 8, wherein the pressure sensing portion, processor portion, and transmitting portion of the sensing/transmitting unit form a single integrated component.

* * * * *